Aug. 9, 1949. H. E. SMITH 2,478,846
FEEDING FLUIDS TO CUTTING TOOLS
Filed Nov. 8, 1946
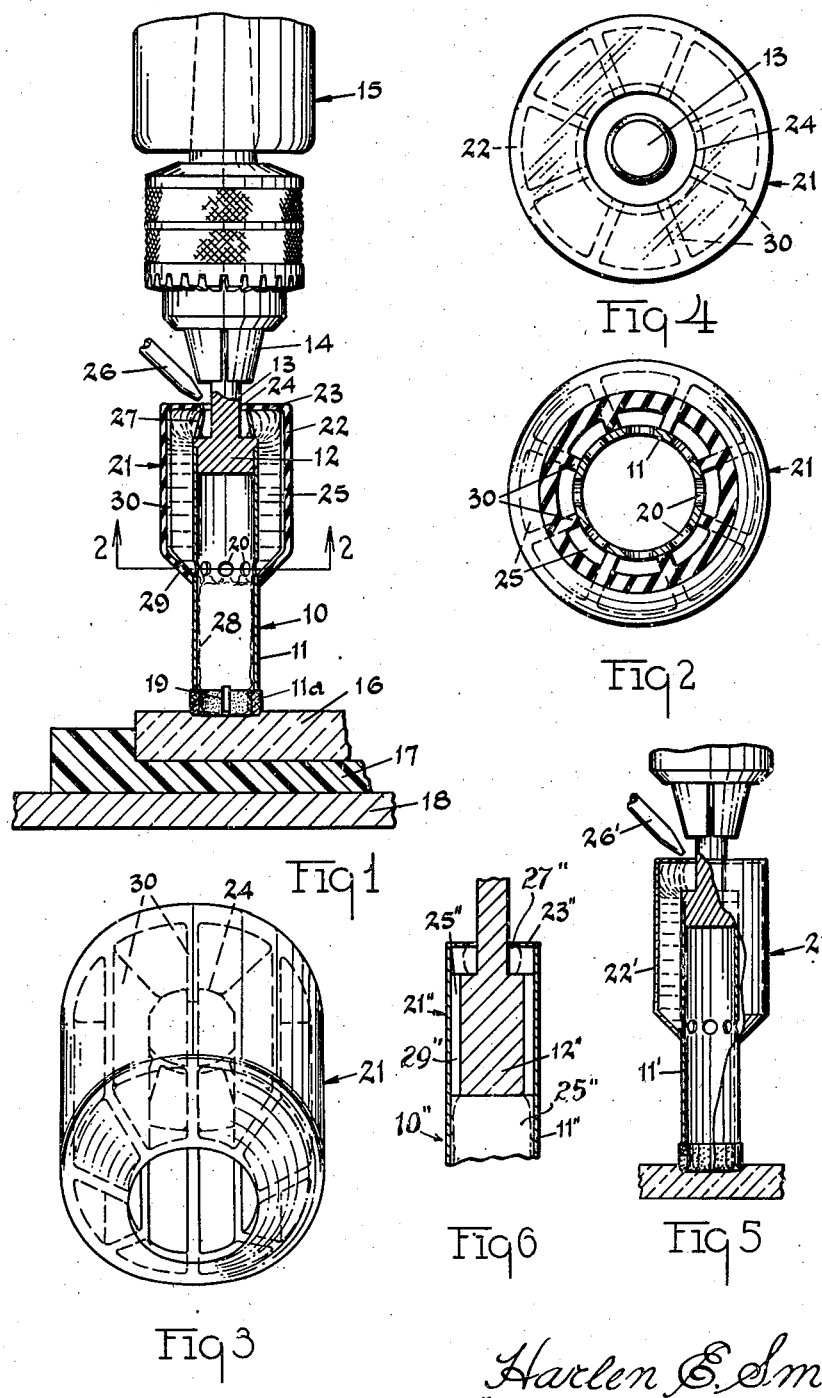
Inventor
Harlen E. Smith
By
Nobbe & Swope
Attorneys Patented Aug. 9, 1949

2,478,846

UNITED STATES PATENT OFFICE 2,478,846

FEEDING FLUIDS TO CUTTING TOOLS

Harlen E. Smith, Parkersburg, W. Va., assignor to Libbey-Owens-Ford Glass Company, Toledo, Ohio, a corporation of Ohio Application November 8, 1946, Serial No. 708,523

5 Claims. (Cl. 125—20)

1

The present invention relates broadly to the art of drilling with tube type drills, and to the feeding of liquids to the cutting edges of such drills. More particularly, it has to do with the drilling of holes in glass using a diamond impregnated tube drill.

It is well known that in order to obtain best results in using either a diamond core or a loose abrasive tube drill in the drilling of glass, the coolant should be fed to the interior of the drill. Various devices have been employed to accomplish this result, but with indifferent success. Presently used methods involve either special drill chucks (using packing gland construction) or a drill press having a hollow spindle. However when, as is preferred, tube drills are run at very high speeds (above 8,000 and possibly as high as 50,000 R. P. M.) such devices do not function efficiently.

It is an aim of this invention to eliminate the necessity for hollow spindle drill presses and special drill chucks, and to overcome the existing difficulties in successfully feeding coolant to the interiors of high speed tube type drills, by the provision of a novel type of adapter or reservoir that can be mounted on the outside of the drill during use, and that will automatically feed the coolant into and through the hollow center of the tool.

Another object is to provide an adapter of the above character, which is of relatively simple construction, and can be easily and securely attached to the drill.

Still another object is the provision of a method of feeding coolant to the interior of a tube type drill, which involves the use of the centrifugal force built up by the rotating drill to force the coolant into the drill from a reservoir on the outside thereof.

Other objects and advantages of the invention will become more apparent during the course of the following description, when taken in connection with the accompanying drawings.

In the drawings, wherein like numerals are employed to designate like parts throughout the same:

Fig. 1 is a front elevation of a portion of a drill press with a preferred form of the adapter of the invention affixed to the outside of the drill;

Fig. 2 is a section taken substantially on the line 2—2 in Fig. 1;

Fig. 3 is a perspective view of the adapter or reservoir removed from the drill;

Fig. 4 is a top plan view of the drill and adapter removed from the press;

2

Fig. 5 is a view similar to Fig. 1, but showing a modified form of adapter; and

Fig. 6 is a sectional view of still another modified form of adapter.

Referring now more particularly to the drawings, there is illustrated in Fig. 1 a common form of diamond impregnated tube type drill, which is designated in its entirety by the numeral 10. The drill 10 is made up of a thin walled metal tube 11, carrying a diamond impregnated cutting portion or segment 11a at its lower end. The upper end of the tube 11 has a plug 12 fitted therein, which plug is provided with a reduced portion 13 forming the shank of the drill. In use, the shank 13 is mounted in, and the drill is driven through, the chuck 14 of a regulation drill press 15.

In the drawings, the drill 10 is shown as drilling holes in a plate of glass 16, which is mounted for the purpose on a pad 17, carried by a suitable bed or platform 18. In an ordinary loose abrasive tube drill, the drilling of the glass is effected by a grinding or abrading operation in that a suitable abrasive material is supplied with the liquid coolant to the glass at the lower end of the drill. The abrasive material will be picked up by the revolving drill and worked into the glass so as to cut a narrow circular hole therethrough by a grinding operation, and the lower edge of the drill is slotted to permit the abrasive material to flow into the path of travel of the cutting edge of the drill.

On the other hand, with the diamond drill shown in the drawings, the cutting action is effected by the grinding action of the diamond particles embedded in the metal of the cutting segment 11a. With these drills no loose abrasive is needed, but the coolant carries a lubricant and also acts to flush away the cuttings. Diamond tube drills should have at least two small slots as at 19 in the diamond segments. No other slots are needed and, in fact, any additional slots merely tend to decrease the lubrication of the cutting edge.

As pointed out above, best results are obtained when the coolant is fed into the interior of the hollow tube 11. According to the present invention this is accomplished by a series of circumferentially arranged feed holes 20, extending through the side wall of the tube, and a reservoir 21 for the coolant which is mounted on the outside of the tube 11 and in open communication with the feed holes.

Essentially, the reservoir 21 is made up of a cylindrical casing 22 in surrounding relation to a part of the tube drill, and provided with a covered portion 23, having an opening 24 therein for receiving coolant from a source of supply. It is necessary that the drills used with this reservoir have a smaller diameter drive shank than the diameter of the drill body, and this is practicable on drill sizes as low as ⅜". The drive shank should be of a size corresponding to the tube drill and is preferably not larger than ½" except in the case of the larger sizes of tube drills. With the large size drills the size of the drive shank does not matter because of the corresponding increase in the size of the reservoir necessary to fit the larger tube.

When the above conditions are met, and the reservoir 22 is filled, and maintained filled, with coolant 25 from the supply pipe 26, centrifugal force set up by the rotation of the drill 10 will build up a head pressure at 27 which will force the liquid 25 down through the reservoir and the tube and then through the feeder holes 20 into the interior of the drill where it will flow down the side walls by gravity as indicated at 28.

In the construction of the tube drill and reservoir, it is important that the cover 23 extend inwardly toward the vertical center line of the drill far enough to insure the point 27, where the head pressure will be built up, being nearer to the center line of the drill than are the feeder openings 20, or the space 29 through which the coolant must be forced, in order to give the desired results.

When a diamond tube drill such as shown in Fig. 1 is used, a mixture of water, water and soluble oil, mineral seal oil, turpentine, etc., is usually fed to the reservoir 22. It is desirable to have the reservoir 22 taper downwardly as at 29 toward the feeder holes 20, and the feeder holes should be appropriate in size to the amount of coolant flow needed for the size of tube drill around its periphery just above the lowest point of contact of the reservoir. It is not necessary that these holes be drilled otherwise than straight through the wall of the tube. However, they should be equally spaced to retain the balance of the tube and to maintain an even flow of liquid around the cutting edge.

To facilitate the use of tube drills with this reservoir or adapter, the length of the body of the tube drill should be standardized. A common thin walled tube drill should never exceed 4 inches in length except where it is necessary to drill through extremely thick glass. This length will cut down vibration and still give a good length of life to the tube.

The adapter or reservoir shown in Fig. 1 is of a special type being preferably made completely of molded rubber, and having a series of radial ribs or fins 30 extending from the inner wall of the cylindrical portion to the outer wall of the tube 11. The outside rim of the reservoir is preferably of hard rubber while the vertical fins and the bottom retaining ring are of medium hardness.

An adapter or reservoir so constructed will fit a number of closely related sizes of drill and will permit easy fitting and removal from the drills. At the same time it gives a well balanced design that will stay water-tight.

In Fig. 5 is shown a modified form of adapter, in that the reservoir 21' shown here is different from the reservoir shown in Fig. 1. The operation is just the same but, instead of rubber, a metallic casing 22' is used and this is welded or otherwise secured to the tube 11' at the lower end of the reservoir.

Still another modified form of adapter, made in accordance with the invention, is shown in Fig. 6. In this arrangement the wall of the tube 11" itself extends upwardly past the plug 12" and is provided with a cover portion 23" to form a reservoir 21" for the coolant 25". Openings or passages 29" for the coolant are cut through the plug 12" outwardly of point 27" where head pressure will be built up by the centrifugal force created when the tube is rotated for drilling. With this arrangement, coolant in the reservoir 21" will be forced downwardly through the passages 29" into the interior of the drill 10" by a combination of centrifugal force and gravity in the same way that the coolant is fed with the constructions of Figs. 1 and 5.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims. For example, the reservoirs of Figs. 1, 5 and 6 could also be used to feed coolant to loose abrasive type tube drills, and the bottoms of the reservoirs could be flat instead of tapered, if desired.

I claim:

1. The combination with a tube type drill of a cylindrical reservoir mounted on said drill, a cover for said reservoir having a round opening centrally thereof, and a passage in the side wall of said drill leading from the reservoir into the interior of the drill, the central opening in said cover being smaller in diameter than the diameter of the drill.

2. The combination with a tube type drill of an adapter comprising a reservoir mounted upon and in surrounding relation to one part of said drill, a cover for said reservoir having a central opening therein, and a passage leading from the reservoir to the interior of the drill and lying outwardly of the opening in said cover as measured from the longitudinal center line of the drill.

3. The combination with a tube type drill, of an adapter comprising a reservoir mounted upon and in surrounding relation to one part of said drill, an angled bottom on said reservoir fitting snugly around said drill, a cover for said reservoir having a central opening therein that is of smaller diameter than the cutting portion of the drill, and a passage through the wall of said drill adjacent the point where said angled bottom engages the drill and leading from the reservoir to the interior of the drill.

4. The combination with a tube type drill, of an adapter comprising a reservoir mounted upon and in surrounding relation to one part of said drill, an angled bottom on said reservoir fitting snugly around said drill, radial fins extending from the side wall of said reservoir into engagement with the drill, a cover for the reservoir having a central opening therein that is of smaller diameter than the cutting portion of the drill, and a passage through the wall of said drill leading from the reservoir to the interior of the drill.

5. The combination with a tube type drill, of an adapter comprising a reservoir made of a relatively resilient and stretchable material mounted on and in surrounding relation to a portion of the drill, an angled bottom on said reservoir having an opening therein adapted to snugly receive the tube of the drill, a cover for said reservoir having a central opening therein that is smaller than the opening in said angled bottom, and a passage through the wall of the drill adjacent the point where the drill tube passes through the opening in the bottom of the reservoir.

HARLEN E. SMITH.

REFERENCES CITED

The following references are of record in the file of this patent:

UNITED STATES PATENTS

| Number | Name | Date |
|---|---|---|
| 1,406,185 | Hansen | Feb. 14, 1922 |
| 1,772,001 | Hall et al. | Aug. 5, 1930 |
| 1,891,361 | Stanley | Dec. 20, 1932 |
| 2,010,475 | Bowen | Aug. 6, 1935 |